United States Patent [19]

Hickok

[11] 4,003,077

[45] Jan. 11, 1977

[54] METHOD AND APPARATUS FOR CANCELLING CHROMINANCE ARTIFACTS

[75] Inventor: William Kelsey Hickok, Rochester, N.Y.

[73] Assignee: Eastman Kodak Company, Rochester, N.Y.

[22] Filed: Feb. 25, 1976

[21] Appl. No.: 661,205

[52] U.S. Cl. .................................... 358/4; 358/14
[51] Int. Cl.² ...................... H04N 5/76; H04N 7/12
[58] Field of Search ................................ 358/4, 14

[56] References Cited

UNITED STATES PATENTS 3,939,485   2/1976   Amari et al. ........................ 358/4
3,969,757   7/1976   Amery ................................ 358/4

Primary Examiner—John C. Martin
Assistant Examiner—Aristotelis M. Psitos
Attorney, Agent, or Firm—R. F. Cody

[57] ABSTRACT

A color video recorder/reproducer records wide bandwidth luminance information alternately with narrow bandwidth luminance information plus chrominance information for the transmitted lines of a television picture frame. Before recording, the chrominance information is frequency converted to occupy a frequency band substantially adjacent to the frequency band occupied by the narrow bandwidth luminance information. Upon playback, the frequency converted chrominance information is separated from the narrow bandwidth luminance information and converted to its originally occupied frequency band. A video signal is then reconstructed by combining the signal recorded for a given line with a complementary portion of the signal recorded for the preceding line. Upon display of a picture thus produced, an artifact pattern is observed. The present invention recognizes the source of this artifact pattern to be the imperfect separation of the narrow bandwidth luminance information from the chrominance information. Rather than employ expensive and complicated filtering devices to better separate the two signals, the present invention permits the small portion of chrominance information to stay in the luminance channel but compensates therefor by so frequency converting the chrominance information before recording that the artifacts thus produced in one line of the picture frame are 180° out of phase with the artifacts in an adjacent line and thus are effectively cancelled out by the integrating characteristics of the eye.

6 Claims, 11 Drawing Figures

RECORD CONFIGURATION

| LINE | LUMINANCE | | CHROMINANCE | |
|---|---|---|---|---|
| | ODD | EVEN | ODD | EVEN |
| 1 | $L_{W1}$ | | | |
| 2 | | $L_{N2}$ | | $C'_2$ |
| 3 | $L_{N3}$ | | $C'_3$ | |
| 4 | | $L_{W4}$ | | |
| 5 | $L_{W5}$ | | | |
| 6 | | $L_{N6}$ | | $C'_6$ |
| 7 | $L_{N7}$ | | $C'_7$ | |
| 8 | | $L_{W8}$ | | |
| 9 | $L_{W9}$ | | | |
| 10 | | $L_{N10}$ | | $C'_{10}$ |
| 11 | $L_{N11}$ | | $C'_{11}$ | |
| 12 | | $L_{W12}$ | | |
| 13 | $L_{W13}$ | | | |
| 14 | | $L_{N14}$ | | $C'_{14}$ |
| 15 | $L_{N15}$ | | $C'_{15}$ | |
| 16 | | $L_{W16}$ | | |
| 17 | $L_{W17}$ | | | |
| 18 | | $L_{N18}$ | | $C'_{18}$ |
| 19 | $L_{N19}$ | | $C'_{19}$ | |

RECORDED INFORMATION BY LINE

FIG. 3

| LINE | |
|---|---|
| 1 | $L_{W1}$ |
| 2 | $L_{N2} + C_2$ |
| 3 | $L_{N3} + C_3 + \overline{L}_{W1}$ |
| 4 | $L_{W4} + C_2$ |
| 5 | $L_{W5} + C_3$ |
| 6 | $L_{N6} + C_6 + \overline{L}_{W4}$ |
| 7 | $L_{N7} + C_7 + \overline{L}_{W5}$ |

RECONSTRUCTED VIDEO SIGNAL

FIG. 4

PLAYBACK CONFIGURATION

| LINE | |
|---|---|
| 1 | $L_{W1}$ |
| 2 | $L_{N2} + C_{L2} + C_2$ |
| 3 | $L_{N3} + C_{L3} + C_3 + \overline{L}_{W1}$ |
| 4 | $L_{W4} + C_2$ |
| 5 | $L_{W5} + C_5$ |
| 6 | $L_{N6} + C_{L6} + C_6 + \overline{L}_{W4}$ |
| 7 | $L_{N7} + C_{L7} + C_7 + \overline{L}_{W5}$ |
| 8 | $L_{W8} + C_6$ |
| 9 | $L_{W9} + C_7$ |
| 10 | $L_{N10} + C_{L10} + C_{10} + \overline{L}_{W8}$ |
| 11 | $L_{N11} + C_{L11} + C_{11} + \overline{L}_{W9}$ |

RECONSTRUCTED
VIDEO SIGNAL

| $n$ | $f_h(n/4)$ MHz |
|---|---|
| 361 | 1.420,017 |
| 381 | 1.498,688 |
| 383 | 1.506,555 |
| 385 | 1.514,422 |
| 391 | 1.538,024 |

METHOD AND APPARATUS FOR CANCELLING CHROMINANCE ARTIFACTS

BACKGROUND OF THE INVENTION

1. Field of the Invention

The present invention relates in general to compensation for artifacts produced by chrominance information leaking into the luminance channel in a color video recorder/reproducer employing alternating line recording. In particular, the chrominance signal is so processed that the artifacts for a pair of adjacent lines are 180° out of phase and thus, upon viewing, appear to cancel each other due to the integrating quality of the eye.

2. Description Relative to the Prior Art

One of the most troubling aspects of color video recording is the relatively large bandwidth needed to record a standard color video signal. Even allowing for acceptable bandwidth attenuation, a minimum bandwidth recording capability of about 4.5 MHz is required. A recording system for handling a signal having information contained in frequencies from about 30 Hz to 4.5 MHz (as in a typical color video signal) is almost unthinkable from an equalization standpoint alone. For example, it is well known that the gap effect causes an increase in head response of about 6 db per octave as frequency increases until a maximum response is reached, at which point the response rapidly drops off to zero. A signal extending from 30 Hz to 4.5 MHz covers over 17 octaves; and a head designed for maximum response at 4.5 MHz will have its response down by more than 100 db at 30 Hz. Such a response range is far too great to be corrected by conventional equalization means.

One avenue of approach to the equalization problem is to obviate the necessity for recording high frequencies by narrowing the bandwidth of the recorded signal. For example, if the video signal could be made to occupy a bandwidth of 2 MHz such a signal could be recorded in a frequency range extending from 0.5 MHz to 2.5 MHz (assuming a direct recording system). Since this frequency range represents only about three octaves, the head response may be equalized in a conventional manner. Further, the highest frequency to be recorded is only 2.5 MHz thereby enabling a tape-to-head speed of one-half that of a direct recording system and one-fourth that of a FM recording system.

U.S. Pat. No. 3,255,303 discloses a method of reducing the bandwidth of the recorded video signal. The method is based upon the realization that the color video signal, as transmitted, contains more information than is absolutely necessary for an acceptable picture. The patent relates to a television signal transmission system wherein luminance information is alternately recorded with chrominance information for each line of a television picture field. The video signal thus recorded contains only about half the information content of the original video signal and can, therefore, be made to occupy a bandwidth about one half as wide as the bandwidth of the original video signal. The video signal thus recorded cannot be transmitted to a television receiver without some processing. Otherwise each line of the transmitted field would contain only luminance or chrominance information, never both, and the resultant picture would be unacceptable both with respect to monochrome and color picture quality. In an attempt to produce an acceptable picture, a video signal for transmission is reconstructed wherein a given line comprises its recorded luminance (or chrominance) information plus the chrominance (or luminance) information of the preceding line.

U.S. application Ser. No. 661,204, filed Feb. 25, 1976 disclosed a color video recorder/reproducer which, while recording all of the luminance and chrominance information of the prior art alternating line recording system described in U.S. Pat. No. 3,255,303, provided the ability to record even more luminance information (luminance information for every line) with no increase in the band-width handling requirements. The color video recorder/reproducer disclosed in that application records wide band-width luminance information alternately with narrow band-width luminance plus chrominance information. The chrominance information is frequency converted to occupy a frequency band substantially adjacent the frequency band occupied by the narrow bandwidth luminance information. The narrow bandwidth luminance plus chrominance information then occupies substantially the same bandwidth as the wide bandwidth luminance information, thereby providing maximum efficiency in the utilization of the bandwidth handling capabilities of the video recorder/reproducer. Upon playback, the frequency converted chrominance information is separated from the narrow bandwidth luminance information and converted to its originally occupied frequency band. A video signal is then reconstructed by combining the signal recorded for a given line with a complementary portion of the signal record for the preceding line.

A picture displayed by the color video recorder/reproducer of U.S. application Ser. No. 661,204 filed Feb. 25, 1976 while representing an improvement over prior art systems, is not totally satisfactory. An artifact pattern is noticeable having a frequency in the 1 MHz range. Artifacts in the 1 MHz range are particularly bothersome because, unlike higher frequency artifacts which tend to disappear or become completely unnoticeable at normal viewing distances, artifacts in the 1 MHz range are large enough to destroy the picture regardless of the viewing distance.

The source of this artifact pattern must, therefore, be located and the problem eliminated; otherwise, the color video recorder/reproducer described above would not be practical in a commercial sense. A clue to the source of the artifact pattern is the frequency of the pattern itself, about 1 MHz. The frequency is too low for the artifact partern to be caused by chrominance information which, residing on a subcarrier of 3.58 MHz, occupies a frequency band from about 3 to 4 MHz. The more likely sources of trouble are an unwanted beat frequency signal improperly filtered, a mechanical defect in the recorder itself, or an amplifier, oscillator, etc., operating in a non-linear fashion.

Although the frequency of the artifact pattern provides a clue which strongly indicates some probable locations for the source of the artifact pattern, the "clue" turns out to be a misleading one. Even though considered unlikely, it has been determined that the observed artifact pattern is the result of chrominance information which has leaked into the luminance channel. While it is not obvious how chrominance information residing on a color subcarrier of 3.58 MHz and having a frequency range from about 3 to 4 MHz can cause artifacts having a frequency of about 1 MHz, it nevertheless has happened. It has been determined that the problem originates at the point where the chrominance information, which, as described above is frequency converted to a frequency band substantially adjacent the narrow bandwidth luminance information for purpose of efficient bandwidth use, is supposedly separated from the narrow bandwidth luminance information. Due to the fact that filters necessarily possess imperfect cut-off characteristics, it is not possible to completely separate the chrominance from the luminance. The result is that frequency converted chrominance information (at a frequency of about 1 MHz) is carried along with the luminance information and, upon display, causes the observed artifact pattern.

SUMMARY OF THE INVENTION

Through the use of costly and elaborate filter networks and associated circuitry it may be possible to prevent the chrominance information from seeping into the luminance channel and thereby reduce the effect of the artifact pattern to an acceptable level. The present invention, however, provides a solution which does not attack the problem by the straightforward and brute force method of providing additional sophisticated filter circuitry but rather solves the problem by finesse. In accordance with the invention, no attempt is made to separate from the luminance signal that portion of the frequency converted chrominance information which contaminates the luminance signal. Instead, when the chrominance information is frequency converted before recording, it is so frequency converted as to render, upon display, the artifact pattern of one line of the picture frame 180° out of phase with the artifact pattern of an adjacent line and since the artifact pattern is very similar for adjacent lines, the resultant artifact pattern, although present, seemingly disappears at normal viewing distances due to the integrating effect of the eye of the viewer.

BRIEF DESCRIPTION OF THE DRAWINGS

In the detailed description of the preferred embodiments of the invention presented below, reference is made to the accompanying drawings in which:

FIGS. 3, 4, 7 and 8 are tables useful in teaching the concept inherent in the invention;

FIG. 9 shows a signal generation circuit.

DESCRIPTION OF THE PREFERRED EMBODIMENTS

Figure 1:
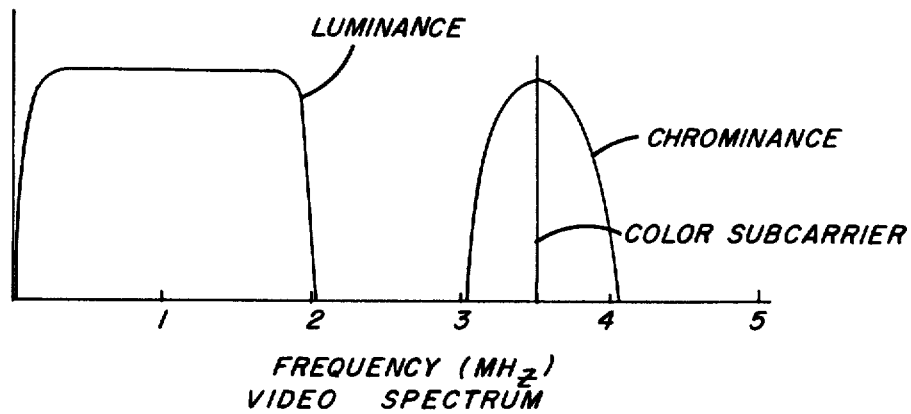
FIG. 1 shows the frequency spectrum of a video signal.

The concept of the present invention is applicable to various types of video recording systems. For sake of definiteness, the present discussion assumes a color television picture signal having a video spectrum as shown in FIG. 1. The luminance information is in the form of an amplitude varying signal having a bandwidth from about 30 Hz to 2 MHz. Chrominance information is contained on a color subcarrier having a frequency of about 3.58 MHz (3.579545) and a bandwidth of about 1 MHz. The video signal shown in FIG. 1 does not represent the entire transmitted video signal, but rather represents a video signal containing only what information is generally considered necessary to produce an acceptable picture. Luminance information above about 2 MHz is ignored as are the higher frequency components of the chrominance information. A video signal of the type shown in FIG. 1 and described above is common in recording systems of the direct record type. In such systems the luminance information is recorded as an amplitude varying signal while the chrominance information is recorded on a color subcarrier. Depending upon the particular direct record system, more, or less, of the luminance and chrominance signals may be made use of. In the present discussion, a luminance band-width of about 2 MHz and a chrominance bandwidth of about 1 MHz are chosen somewhat arbitrarily and practice of the present invention is not limited thereto.

Figure 2:
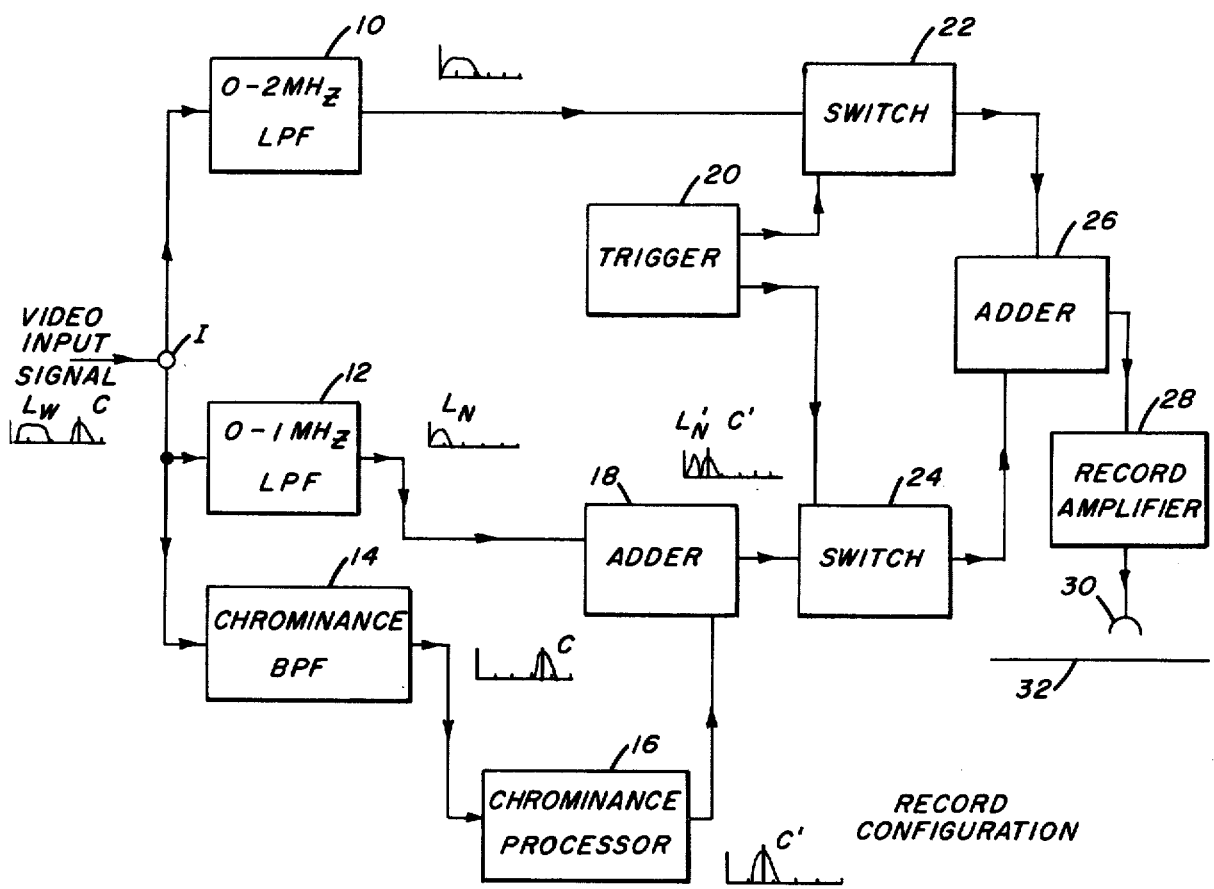
FIG. 2 is a block diagram of a record configuration incorporating an embodiment of the present invention.

Referring to FIG. 2, a video input signal having the form discussed in connection with FIG. 1 is applied to a junction 1. A portion of the video signal passes through a 0–2 MHz low pass filter (LPF) 10 which has the effect of blocking the chrominance information and passing the 2 MHz wide band of luminance information, $L_W$. Another portion of the video signal passes through a 0–1 MHz LPF 12 which permits only a 1 MHz wide band of luminance information, $L_N$, to pass. ($L_W$ represents the "wide" bandwidth luminance signal extending from about 0 to 2 MHz and $L_N$ represents the "narrow" bandwidth luminance signal extending from 0 to about 1 .MHz.) Yet another portion of the video signal passes through a chrominance band pass filter (BPF) 14 with the result that the chrominance signal, C, is passed while the luminance signal is blocked. Up to this point, $L_N$ (occupying a bandwidth from 0–1 MHz) and C (occupying a bandwidth from about 3.1 to 4.1 MHz) are separated by about 2.1 MHz. For reasons discussed below, a chrominance processor 16 is provided to frequency convert the color sub-carrier from 3.58 MHz to about 1.5 MHz thereby causing the chrominance signal C to occupy a bandwidth extending from about 1 to 2 MHz. The chrominance processor 16 does not just frequency convert the color subcarrier to any frequency around 1.5 MHz, but rather to one of a group of discrete frequencies as is described in detail below. The chrominance signal so converted is labeled $C'$. $L_N$ and $C'$ are combined in an adder 18 to form a composite signal $L_N+C'$ having an overall bandwidth extending from 0 to 2 MHz. There is now a certain symmetry between $L_W$ and the combination $L_N+C'$, both signals occupying a bandwidth extending from about 0 to 2 MHz. Thus, either $L_W$ or $L_N+C'$ can be recorded by a system having a 2 MHz bandwidth recording capability. In effect, two signals, each having one half the bandwidth of the original video signal (FIG. 1), have been constructed and will be alternately recorded for the transmitted lines of a television picture frame.

To alternately record the signals $L_W$ and $L_N+C'$, a pair of switches 22 and 24 activated by a trigger 20 are employed. The trigger 20 generates a trigger signal causing the switch 22 to assume a closed position for the duration of one horizontal scan line, about 63.5 us, thereby permitting the luminance signal $L_W$ for that line to be passed by the switch 22 to an adder 26. Concurrently, the switch 24 assumes an open position, thereby preventing the signal $L_N+C'$ from passing to the adder 26. At the termination of a horizontal scan line, and for the duration of the next horizontal scan line, the trigger 20 generates another trigger signal causing the switch 24 to assume a closed position and the switch 22 to be open. Now the signal $L_N+C'$ is passed by the switch 24 to the adder 26 and the luminance signal $L_W$ is blocked by the switch 22. The trigger 20 and the switches 22 and 24 continue operating in this "flip-flop" sequence. The output signal from the adder 26 thus comprises the signal $L_W$ for one line, the signal $L_N+C'$ for the next line, and so on. This output signal is fed to a record amplifier 28 which provides the necessary amplification to drive a recording head 30 to record the signal on a record medium 32.

FIG. 3 shows in tabular form the recorded signals for the first 19 lines of a picture frame. The recorded information is broken down into luminance and chrominance information and, further, by odd and even fields. As seen from FIG. 3, line 5 of the picture frame, an odd field line, has wide bandwidth luminance information, $L_{W_5}$, recorded. Line 6, an even field line, has narrow bandwidth luminance information, $L_{N_6}$, plus the full bandwidth chrominance information $C'_6$; and so on for the remaining lines. It should be realized that since the odd field lines are transmitted sequentially, and then the even field lines, the alternating line recording technique described in connection with FIG. 2 results in the recording of chrominance information, $C'$, for a pair of adjacent lines (e.g. lines 6 and 7) and no recorded chrominance information for the next pair of lines (e.g. lines 8 and 9). Similarly, wide bandwidth luminance information, $L_W$, is recorded for one pair of adjacent lines (e.g. lines 4 and 5) while narrow bandwidth luminance information, $L_N$, is recorded for the next pair of adjacent lines (e.g. lines 6 and 7). As stated, this "pairing" pattern of recorded information arises because adjacent lines in the transmitted signal (say odd field lines) appear as alternate lines (interlaced with even field lines) in the displayed picture frame.

One concept of video signal reconstruction upon playback of the recorded signals provides for information recorded for one line of the picture frame to be combined with complementary information recorded from the previous line (the order of lines is the order in which they are transmitted, not how they appear on a screen). For example, line 4 has recorded wide bandwidth luminance information, $L_{W_4}$, (FIG. 3) and line 2 has recorded narrow bandwidth luminance information, $L_{N_2}$, plus chrominance information $C'_2$. The complementary information from line 2 which is added to line 4 is the chrominance information $C'_2$ frequency converted back to its original frequency range, $C_2$. Therefore line 4, after reconstruction, will contain the signal $L_{W_4}+C_2$. Upon playback of all lines similar to line 4, therefore, circuitry must be provided to separate $C'_2$ from $L_{N_2}$, frequency convert $C'_2$ to $C_2$, and combine $C_2$ and $L_{W_4}$.

Reconstruction of line 6 is based upon the same principle but is slightly more involved. Line 6 contains narrow bandwidth luminance information, $L_{N_6}$, and chrominance information, $C'_6$ (FIG. 3). Line 4 contains wide bandwidth luminance information, $L_{W_4}$. The complementary portion of $L_{W_4}$ which is added to $L_{N_6}+C'_6$ is the high frequency portion contained in $L_{W_4}$ outside of the bandwidth range of $L_{N_6}$. Since, the narrow bandwidth luminance signals occupy bandwidths extending from 0–1 MHz and the wide bandwidth luminance signals occupy bandwidths extending from 0–2 MHz, the luminance information of $L_{W_4}$ contained in a bandwidth extending from 1–2 MHz is separated and added to $L_{N_6}$ to produce a reconstructed luminance signal having a bandwidth extending from 0–2 MHz. Designating the portion of $L_{W_4}$ having frequencies from 1–2 MHz as $\overline{L}_{W_4}$, the entire reconstructed signal for line 6 is $(L_{N_6}+\overline{L}_{W_4})+C_6$. Reconstruction of the video signal for other lines is analogous and FIG. 4 shows the reconstructed video signal for the first 7 lines of the picture frame.

Figure 5:
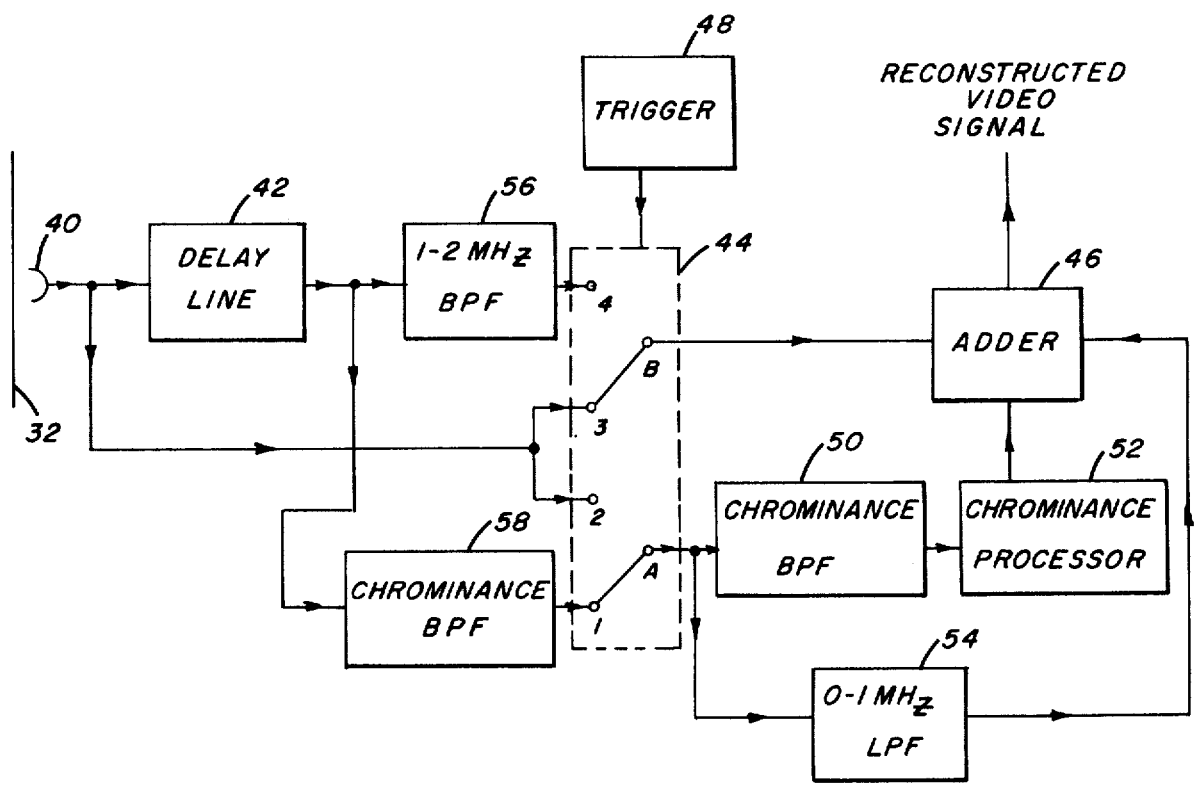
FIG. 5 is a block diagram of a playback configuration suitable for reconstructing the video signal.

One possible playback configuration which attempts the reconstruction of the video signal as described above is shown in FIG. 5. A playback head 40 senses the recorded signal on the record medium 32. Assume, for the moment, line 1 is being played back. The signal recorded on line 1 is applied to a delay line 42 which provides a time delay equal in duration to one horizontal scan line (63.5 us) and also is applied to terminals 2 and 3 of a switch 44. The switch 44 has two poles designated as pole A which switches between terminals 1 and 2, and pole B which switches between terminals 3 and 4. The signal played back for line 1 is $L_{W_1}$ and is passed directly via pole B to an adder 46. As no signal has yet reached terminal 1 of the switch 44, the reconstructed video signal for line 1 is $L_{W_1}$ (FIG. 4). As the playback head 40 senses the signal recorded for the next line (line 3), a trigger 48 generates a trigger signal causing pole A to contact terminal 2 and pole B to contact terminal 4. Applied to terminal 2 is the signal recorded for line 3, i.e. $L_{N_3}+C'_3$, and the signal $L_{N_3}+C'_3$ is thus applied to a chrominance BPF 50 which passes $C'_3$ to a chrominance processor 52, while a luminance LPF 54 passes $L_{N_3}$ to the adder 46. The chrominance processor 52 frequency converts the color subcarrier (which was down converted by the chrominance processor 16 in FIG. 2 prior to recording) to a frequency of 3.58 MHz, its original frequency. The converted chrominance signal $C_3$ is applied to the adder 46. Now, since the delay line 42 introduces a time delay equal in duration to one horizontal scanning line, the signal from the previous line, line 1, now appears at terminal 4 modified by a BPF 56 which passes only those frequencies of $\overline{L}_{W_1}$ between 1 and 2 MHz, thereby forming $\overline{L}_{W_1}$ which is passed via pole B to the adder 46. Thus for line 3, the reconstructed video signal comprises $(L_{N_3}+\overline{L}_{W_1})+C_3$, in agreement with FIG. 4.

Similarly, at the beginning of line 5, the trigger 48 switches pole A back to terminal 1 and pole B to terminal 3. The signal recorded for line 5, $L_{W_5}$, is applied directly to terminal 3 and passed via pole B to the adder 46. The signal recorded for line 3, $L_{N_3}+C'_3$, is now applied via the delay line 42 to terminal 1 after being modified by a chrominance BPF 58. The effect of the chrominance BPF 58 is to convert $L_{N_3}+C'_3$ into $C'_3$, i.e., only $C'_3$ is passed by the chrominance BPF 58 and applied to terminal 1. Thus, $C'_3$ gets frequency converted (now becoming $C_3$) to its original frequency range by the chrominance processor 52 and is then applied to the adder 46. The reconstituted video signal for line 5 is, therefore, $L_{W_5}+C_3$. It is thus seen that the playback configuration, in theory, reconstructs the video signal in accordance with the reconstructed signals tabled in FIG. 4.

A video signal so reconstructed contains both luminance and chrominance information for every line. In the case of the luminance information, at least a portion represents the actual information transmitted for each line. For those lines wherein only narrow bandwidth luminance information was recorded, a complementary portion of the wide bandwidth luminance information delayed from the previous line has been added. The luminance (monochrome) and chrominance (color) portions of a picture generated from such a reconstructed video signal appear acceptable. However, an artifact pattern can be observed which should be eliminated or rendered less visible in order to have a commercially feasible product.

Figure 6A:
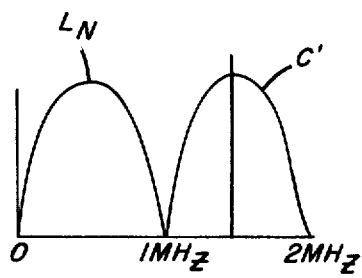
FIG. 6 shows the ideal vs. the actual effect of a filter upon a signal.
Figure 6B:
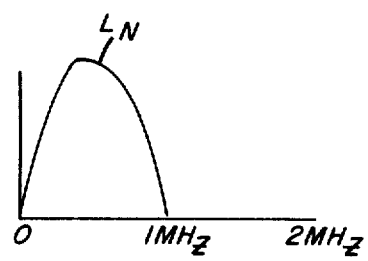
Figure 6C:
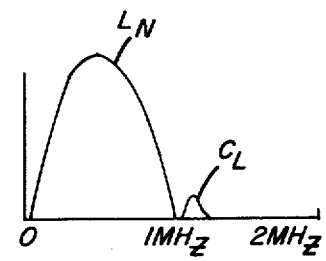

As previously discussed, it has been found that the artifact pattern arises from one of the less obvious sources, and in particular arises in the 0–1 MHz LPF 54. The problem with the LPF 54 is that the frequency response at the cutoff frequency is not, and cannot be made to be, a step function. FIG. 6a shows the "sandwiched" narrow bandwidth luminance information and chrominance information. The LPF 54 ideally should pass only the narrow bandwidth luminance information as shown in FIG. 6b. But since the frequency response about the cut-off frequency of the LPF 54 cannot be made a step function, it is necessary to extend the effective cutoff frequency somewhat higher than 1 MHz to prevent unacceptable attenuation of the luminance information. The result is that a small portion of the chrominance information remains with the luminance information as shown in FIG. 6c. This small portion of chrominance information gets processed in the television receiver circuitry as luminance information and appears in a displayed picture as an artifact pattern having a frequency of about 1 MHz. The portion of the chrominance information which is thus leaked through the luminance channel corresponds to the high frequency color information and the artifact pattern is thus most noticeable about edges of vertical bars.

It may be possible to eliminate or sufficiently ameliorate the artifact pattern through the use of costly and sophisticated filter networks for the LPF 54. This would be a straightforward but brute force approach. However, by a more sophisticated approach to the problem, it is possible to effectively eliminate the artifact pattern and still use a simple and inexpensive variety of filter for the LPF 54.

Figures 7, 8, 9:
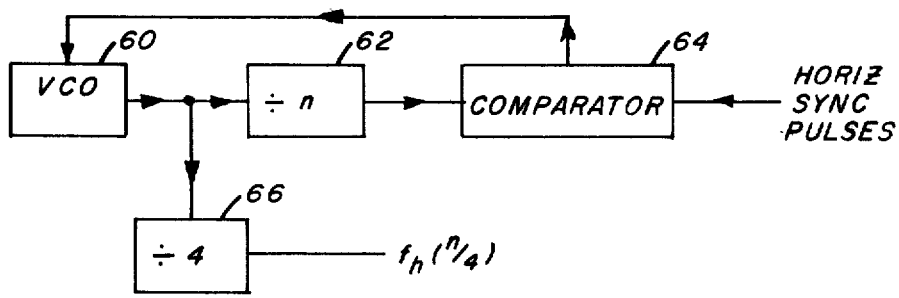

Taking the more sophisticated approach which provides the simpler and less costly solution, reference is now made to FIG. 7. FIG. 7 is basically the same table as FIG. 4 except that more lines are shown and the symbol "$C_L$" appears for every other line pair. $C_L$ represents that portion of the chrominance information which has been mistakenly passed by the LPF 54, see FIG. 6c. Thus, every $L_N$ in the reconstructed video signal is, in actuality, $L_N + C_L$. As shown in FIG. 7, lines 2 and 3 contain $CL_2$ and $CL_3$, lines 6 and 7 contain $CL_6$ and $CL_7$, and so on down to lines 524 and 525 which, although not shown, contain $C_{L524}$ and $C_{L525}$. The present invention recognizes that color information for adjacent lines is usually very similar and, therefore $C_{L_2}$ and $C_{L_3}$ ($C_{L_6}$ and $C_{L_7}$, etc.) are close to being the same signal. In light of this recognition, the present invention therefore proposes carefully frequency converting the color subcarrier before recording, not just to any frequency near 1.5 MHz, but to one of a selected group of discrete frequencies so chosen as to render $C_{L_2}$ and $C_{L_3}$ 180° out of phase at the start of their respective field lines. The requirement for this condition to be met is that the color subcarrier be converted to a frequency such that the color carrier of one line of the television signal is 90° out of phase relative to the color carrier of the preceding line. Such a condition, due to the relatively small width of a line in relation to normal viewing distances, will result in the apparent vanishing of the artifact pattern. In actuality, the artifact pattern for adjacent lines cancels due to the integrating property of the eye. The present invention, in effect, employs the eye of the viewer as part of the artifact pattern elimination circuitry.

In order for the above conditions to be met, the color subcarrier should be converted to a frequency equal to $f_h$ ($n/4$) where $f_h$ is the horizontal scanning frequency (15,734.265 Hz in most American color sets) and $n$ is an integer. FIG. 8 is a table of $f_h$ ($n/4$) for various values of n chosen to give a converted color subcarrier frequency about 1.5 MHz. So long as any of the frequencies from the table of FIG. 8 are chosen, or any of the other frequencies corresponding to values of $n$ not listed, the condition is met for $C_{L_2}$ and $C_{L_3}$ and $C_{L_7}$ . . . , $C_{L524}$ and $C_{L525}$ to effectively cancel and thus render the artifact pattern invisible for normal viewing distances. The chrominance processor 16 in FIG. 2 need only be set to frequency convert the color subcarrier to one of the frequencies listed in FIG. 8.

A circuit capable of producing a signal having a frequency of $f_h$ ($n/4$) is shown in FIG. 9. A voltage controlled oscillator (VCO) 60 oscillates at a nominal frequency of $f_h$ ($n$) where $f_h$ is the horizontal scanning frequency and $n$ is an integer. After passing through a divide by $n$ circuit 62, the frequency of VCO 60 is compared by a comparator 64 to the exact horizontal scanning frequency as determined by the horizontal sync pulses. A control signal, indicative of this comparison, is produced by the comparator 64 and fed to the VCO 60, thereby adjusting the frequency of oscillation whenever such adjustment is necessary. The output signal is obtained by passing the signal produced by the VCO 60 through a divide by 4 circuit 66 to thereby yield a signal having the desired frequency of $f_h$ ($n/4$).

Throughout the specification, a video signal having a video spectrum as shown in FIG. 1 has been assumed. It will be apparent that the frequencies indicated in FIG. 1 are relative frequencies and by making straightforward modifications of the described circuitry, a video signal having a spectrum shifted from the spectrum shown in FIG. 1 my be handled. A spectrum different from FIG. 1 may be advantageous for purposes of reducing the octave range of the recorded/reproduced signal. For example, if the input video signal extends from about 0.5 MHz to about 4.5 MHz (rather than 30 Hz to 4 MHz as shown in FIG. 1) assuming appropriate modifications are made to the circuitry of FIGS. 2 and 5, the recorded/reproduced signals will still occupy a bandwidth of 2 MHz but will now have a frequency range extending from about 0.5 MHz to 2.5 MHz (as opposed to 30 Hz to 2 MHz). The result is a reduction in the octave range from about 16 octaves to 3 octaves. Alternatively, additional circuitry may be employed to frequency convert the recorded signal to a more favorable frequency range. The advantage of a compressed octave range has been previously discussed.

The invention has been described in detail with particular reference to preferred embodiments thereof, but it will be understood that variations and modifications can be effected within the spirit and scope of the invention. For example, depending upon the frequency range chosen for the narrow bandwidth luminance information (chosen as 0–1 MHz here, for the sake of illustration) it may be convenient to convert the color subcarrier to frequencies other than those listed in FIG. 8 by choosing larger or smaller values of $n$.

What is claimed is:

1. In a color video recorder of the type employing an alternating line recording scheme wherein chrominance signal information residing on a color carrier and luminance signal information are extracted from a color television signal and are alternately recorded for transmitted lines of the color television signal, the improvement wherein:

the color carrier on which the chrominance signal information resides is converted before recording to a frequency such that the color carrier of one line of the color television signal is substantially 90° out of phase relative to the color carrier of the preceding line.

2. Apparatus as claimed in claim 1 wherein the color carrier is converted to one of the frequencies given by $f_h (n/4)$ where $f_h$ is the horizontal scanning frequency and $n$ is an integer.

3. In a color video recorder of the type employing an alternating line recording technique wherein chrominance signal information residing on a color carrier, narrow bandwidth luminance signal information, and wide bandwidth luminance signal information are extracted from a color television signal, the wide bandwidth luminance signal information being alternately recorded with the narrow bandwidth luminance signal information plus the chrominance signal information, and before recording the chrominance signal information, is converted to a frequency band substantially adjacent the frequency band occupied by said narrow bandwidth luminance signal information, the improvement wherein:

the color carrier on which the chrominance signal information resides is frequency converted before recording to such a frequency that the color carrier of one line of the color television signal is substantially 90° out of phase relative to the color carrier of the preceding line.

4. Apparatus as claimed in claim 3 wherein the color carrier is converted to one of the frequencies given by $f_h (n/4)$ where $f_h$ is the horizontal scanning frequency and $n$ is an integer.

5. Apparatus for processing a color television signal for recording on a record medium, the color television signal comprised of luminance signal information and chrominance signal information residing on a color carrier, said apparatus comprising:
   a. means for receiving a color television signal comprised of luminance signal information and chrominance signal information;
   b. means for processing the received color television signal to extract therefrom wide bandwidth luminance signal information, narrow bandwidth luminance signal information, and chrominance signal information on a color carrier;
   c. means for frequency converting the color subcarrier to a frequency such that (1) the frequency band occupied by said chrominance signal information is substantially adjacent the frequency band occupied by said narrow bandwidth luminance signal information and (2) the color carrier of one line of said color television signal is substantially 90° out of phase relative to the color carrier of the preceding line;
   d. means for combining a plurality of signals applied thereto; and
   e. switching means for applying to said signal combination means said wide bandwidth luminance signal information alternately with said narrow bandwidth luminance signal information plus said converted chrominance signal information, whereby a signal is produced for recording on a record medium alternately comprising said wide bandwidth luminance signal information and said narrow bandwidth luminance signal information plus said converted chrominance signal information.

6. Apparatus as claimed in claim 5 wherein the color carrier is converted to one of the frequencies given by $f_h (n/4)$ where $f_h$ is the horizontal scanning frequency and $n$ is an integer.